US011374485B2

(12) United States Patent
Schekulin

(10) Patent No.: US 11,374,485 B2
(45) Date of Patent: Jun. 28, 2022

(54) FILTER UNIT AND FREQUENCY INVERTER

(71) Applicant: Schmidhauser AG, Romanshorn (CH)

(72) Inventor: Dirk Schekulin, Gais (CH)

(73) Assignee: Schmidhauser AG, Romanshorn (CH)

( * ) Notice: Subject to any disclaimer, the term of this patent is extended or adjusted under 35 U.S.C. 154(b) by 0 days.

(21) Appl. No.: 16/981,324

(22) PCT Filed: Mar. 15, 2019

(86) PCT No.: PCT/EP2019/056637
§ 371 (c)(1),
(2) Date: Sep. 16, 2020

(87) PCT Pub. No.: WO2019/175429
PCT Pub. Date: Sep. 19, 2019

(65) Prior Publication Data
US 2021/0067029 A1    Mar. 4, 2021

(30) Foreign Application Priority Data

Mar. 16, 2018 (DE) .................... 10 2018 204 090.7

(51) Int. Cl.
*H02M 1/12* (2006.01)
*H02P 27/06* (2006.01)
(52) U.S. Cl.
CPC ............ *H02M 1/126* (2013.01); *H02P 27/06* (2013.01); *H02P 2201/11* (2013.01)
(58) Field of Classification Search
CPC .... H02M 1/126; H02P 27/06; H02P 2201/09; H02P 27/04
See application file for complete search history.

(56) References Cited

U.S. PATENT DOCUMENTS 5,381,328 A * 1/1995 Umezawa ............. H02M 7/493
363/41
5,734,249 A * 3/1998 Pohjalainen ............ H02P 23/30
318/798

(Continued)

FOREIGN PATENT DOCUMENTS

AT          505 534 B1    7/2011
DE       93 07 806 U1    8/1993
(Continued)

OTHER PUBLICATIONS

International Search Report (PCT/ISA/210) issued in PCT Application No. PCT/EP2019/056637 dated Jun. 28, 2019 with English translation (four (4) pages).

(Continued)

*Primary Examiner* — Muhammad S Islam
(74) *Attorney, Agent, or Firm* — Crowell & Moring LLP

(57) ABSTRACT

A filter unit is intended to be connected between an inverter and an electric motor. The filter unit includes: a number of phase connections for connecting to corresponding phase connections of the inverter; a first DC link connection for connecting to a first DC link connection on the inverter and a second DC link connection for connecting to a second DC link connection on the inverter; a number of motor connections for connecting to corresponding connections on the electric motor; a number of filter elements for reducing a rate of voltage rise at the motor connections of the filter unit, filter element is connected between corresponding phase connections of the filter unit and corresponding motor connections of the filter unit; and a coupling unit, which couples the filter elements capacitively with the first DC link connection and the second DC link connection of the filter unit.

13 Claims, 3 Drawing Sheets

(56) References Cited

U.S. PATENT DOCUMENTS

| | | | |
|---|---|---|---|
| 5,872,710 A * | 2/1999 | Kameyama | H02M 7/53875 |
| | | | 363/95 |
| 10,630,204 B2 | 4/2020 | Schneggenburger et al. | |
| 2009/0219001 A1* | 9/2009 | Kimura | B60L 15/007 |
| | | | 323/282 |
| 2010/0019710 A1* | 1/2010 | Schwarzkopf | H02P 6/182 |
| | | | 318/400.35 |
| 2015/0381167 A1* | 12/2015 | Sicard | H03K 17/687 |
| | | | 318/139 |
| 2018/0219546 A1* | 8/2018 | Yang | H02M 7/5387 |
| 2018/0367025 A1* | 12/2018 | Rasek | H02M 7/483 |

FOREIGN PATENT DOCUMENTS

| | | |
|---|---|---|
| DE | 10 2005 045 552 B4 | 4/2008 |
| DE | 10 2015 221 354 A1 | 5/2017 |
| WO | WO 2017/072297 A1 | 5/2017 |

OTHER PUBLICATIONS

German-language Written Opinion (PCT/ISA/237) issued in PCT Application No. PCT/EP2019/056637 dated Jun. 28, 2019 (six (6) pages).

* cited by examiner

FILTER UNIT AND FREQUENCY INVERTER

BACKGROUND AND SUMMARY OF THE INVENTION

The invention relates to a filter unit and to a frequency inverter having such a filter unit.

Switching speeds of modern power semiconductors for inverters are becoming ever greater. At present, a development state has been achieved that requires electric motors with special insulation systems if it is desired to use the maximum switching speeds of 10-14 kV/µs for standard IGBTs. This may lead to a situation whereby an available switching power of the IGBTs is no longer fully utilized and switching is performed more slowly.

In the case of using SiC transistors, a switching speed of more than 100 kV/µs is expected in the future, which will imperatively require additional limitation of the voltage slew rate.

In order to limit the voltage slew rate to a tolerable degree (for example <1 kV/µs), the prior art discloses what are known as du/dt filters that are connected between the output of the inverter and the electric motor.

The invention is based on the object of providing a filter unit, for example in the form of a du/dt filter, and a frequency inverter, that exhibit lower losses, and/or have a lower structural volume, and/or have a lower weight in comparison with filter units from the prior art.

The invention achieves this object by way of a filter unit and a frequency inverter according to the claimed invention.

The filter unit according to the invention is intended to be connected or interconnected between an, in particular, conventional inverter and an electric motor.

The filter unit has a number of phase terminals for connection to corresponding phase terminals of the inverter. The filter unit may for example have precisely three phase terminals.

The filter unit furthermore has a first intermediate circuit terminal for connection to a first intermediate circuit terminal of the inverter. The inverter may for example output a positive intermediate circuit potential at the first intermediate circuit terminal.

The filter unit furthermore has a second intermediate circuit terminal for connection to a second intermediate circuit terminal of the inverter. The inverter may for example output a negative intermediate circuit potential at the second intermediate circuit terminal.

A potential difference between the positive and negative intermediate circuit potential may for example constitute an intermediate circuit voltage.

The filter unit furthermore has a number of motor terminals for connection to corresponding terminals of the electric motor. The filter unit may for example have precisely three motor terminals for electrical connection to associated phase terminals of the electric motor.

The filter unit furthermore has a number of filter elements. The filter unit may for example have precisely three filter elements. The filter elements may for example be inductive components in the form of chokes.

A respective filter element is interconnected between corresponding phase terminals of the filter unit and corresponding motor terminals of the filter unit. By way of example, a first filter element is interconnected between a first phase terminal and a first motor terminal, a second filter element is interconnected between a second phase terminal and a second motor terminal and a third filter element is interconnected between a third phase terminal and a third motor terminal.

The filter unit furthermore has a coupling unit that capacitively couples the filter elements to the first intermediate circuit terminal and the second intermediate circuit terminal of the filter unit.

The filter elements, in connection with the capacitive coupling unit, reduce a voltage slew rate at the motor terminals of the filter unit.

According to one embodiment, the coupling unit has a number of capacitors. The coupling unit may for example have six capacitors. When using a cable connection, capacitances in the cable connection may have considerable additional capacitances and thus additionally reduce the voltage slew rate. This may influence the dimensioning of the number of capacitors. In the event of sufficient capacitances in the cable connection, the number of capacitors may possibly be completely dispensed with.

By way of example, a first capacitor may be interconnected between a first motor terminal and the first intermediate circuit terminal, a second capacitor may be interconnected between a second motor terminal and the first intermediate circuit terminal, a third capacitor may be interconnected between a third motor terminal and the first intermediate circuit terminal, a fourth capacitor may be interconnected between the first motor terminal and the second intermediate circuit terminal, a fifth capacitor may be interconnected between the second motor terminal and the second intermediate circuit terminal and a sixth capacitor may be interconnected between the sixth motor terminal and the second intermediate circuit terminal.

According to one embodiment, the capacitors are ceramic capacitors.

According to one embodiment, the coupling unit has a voltage clamping unit that limits a difference between a respective potential at the motor terminals and a potential at the first intermediate circuit terminal to a predefined first potential difference. The voltage clamping unit may furthermore limit a difference between a respective potential at the motor terminals and a potential at the second intermediate circuit terminal to a predefined second potential difference. The first and the second potential difference may be identical or different. The first and the second potential difference may for example have a value of approximately 30 V.

According to one embodiment, the coupling unit has an active feedback unit that transfers energy from the voltage clamping unit to an intermediate circuit of an inverter connected to the first intermediate circuit terminal and connected to the second intermediate circuit terminal.

According to one embodiment, the feedback unit has at least one step-down converter.

According to one embodiment, the feedback unit has at least one flyback converter.

According to one embodiment, the voltage clamping unit has a first voltage clamping subunit that limits a difference between the respective potential at the motor terminals and the potential at the first intermediate circuit terminal to the predefined first potential difference. The voltage clamping unit furthermore has a second voltage clamping subunit that limits a difference between the respective potential at the motor terminals and the potential at the second intermediate circuit terminal to the predefined second potential difference.

According to one embodiment, the feedback unit has a first feedback subunit that transfers energy from the first voltage clamping subunit to an intermediate circuit of an inverter connected to the first intermediate circuit terminal and connected to the second intermediate circuit terminal. The feedback unit accordingly has a second feedback subunit that transfers energy from the second voltage clamping subunit to the intermediate circuit of the inverter connected to the first intermediate circuit terminal and connected to the second intermediate circuit terminal.

The invention is described in detail below with reference to the drawings.

DETAILED DESCRIPTION OF THE DRAWINGS

Figure 1:
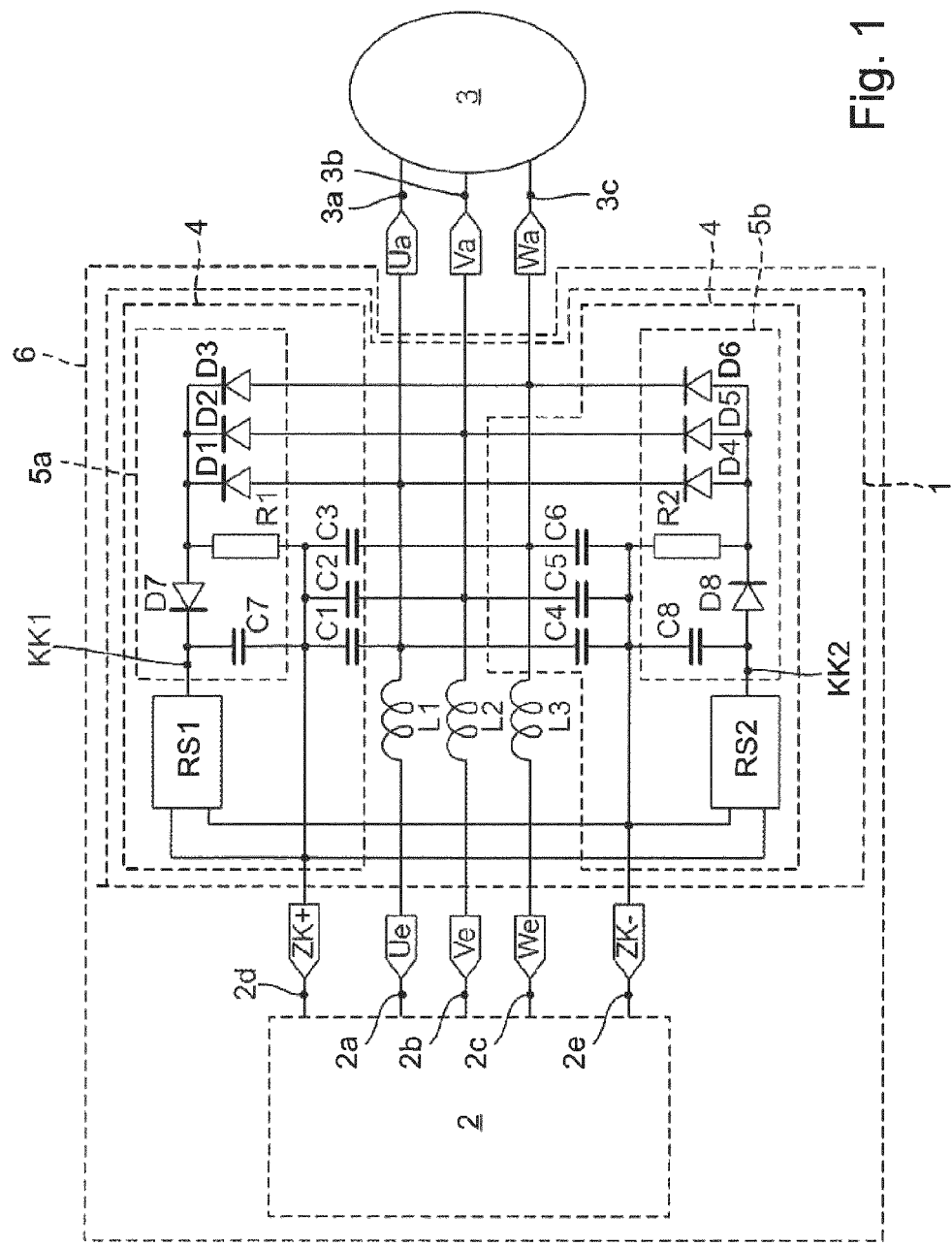
FIG. 1 shows a drive system having an inverter, a filter unit according to an embodiment of the invention and an electric motor.

FIG. 1 shows a drive system having a frequency inverter 6 and a conventional electric motor 3 that is driven by way of the frequency inverter 6.

The frequency inverter 6 has a conventional inverter 2 and a filter unit 1 connected downstream of the inverter 2 and that forms a du/dt filter.

The inverter 2 converts a DC voltage into AC voltage or a DC current into AC current. The inverter may for this purpose for example conventionally have a number of driveable inverter bridges to which an intermediate circuit voltage is applied and that are driven depending on output voltages to be generated. For the rest, reference is also made to the relevant specialist literature.

The filter unit 1 is connected between the inverter 2 and the electric motor 3.

The filter unit 1 has three phase terminals Ue, Ve, We for connection to corresponding phase terminals 2a, 2b, 2c of the inverter 2.

The filter unit 1 furthermore has a first intermediate circuit terminal ZK+ for connection to a first intermediate circuit terminal 2d of the inverter 2 and a second intermediate circuit terminal ZK− for connection to a second intermediate circuit terminal 2e of the inverter 2.

The filter unit 1 furthermore has three motor terminals Ua, Va, Wa for connection to corresponding phase line terminals 3a, 3b, 3c of the electric motor 3.

The filter unit 1 furthermore has three filter elements L1, L2, L3 in the form of chokes or coils for reducing a voltage slew rate at the motor terminals Ua, Va, Wa of the filter unit 1.

The first coil L1 is interconnected between the first phase terminal Ue and the first motor terminal Ua, the second coil L2 is interconnected between the second phase terminal Ve and the second motor terminal Va and the third coil L3 is interconnected between the third phase terminal We and the third motor terminal Wa.

The filter unit 1 furthermore has a coupling unit 4 that capacitively couples the coils L1, L2, L3, at their motor terminal side, in each case to the first intermediate circuit terminal ZK+ and the second intermediate circuit terminal ZK−.

The coupling unit 4 has six capacitors C1 to C6, which are in the form of ceramic capacitors. The capacitor C1 is interconnected between the terminal, coupled to the first motor terminal Ua, of the coil L1 and the first intermediate circuit terminal ZK+, the capacitor C2 is interconnected between the terminal, coupled to the second motor terminal Va, of the coil L2 and the first intermediate circuit terminal ZK+, the capacitor C3 is interconnected between the terminal, coupled to the third motor terminal Wa, of the coil L3 and the first intermediate circuit terminal ZK+, the capacitor C4 is interconnected between the terminal, coupled to the first motor terminal Ua, of the coil L1 and the second intermediate circuit terminal ZK−, the capacitor C5 is interconnected between the terminal, coupled to the second motor terminal Va, of the coil L2 and the second intermediate circuit terminal ZK− and the capacitor C6 is interconnected between the terminal, coupled to the third motor terminal Wa, of the coil L3 and the second intermediate circuit terminal ZK−.

The coupling unit 4 has a voltage clamping unit having a first voltage clamping subunit 5a and a second voltage clamping subunit 5b that respectively limit a difference between a respective potential at the motor terminals Ua, Va, Wa and a potential at the first intermediate circuit terminal ZK+ to a predefined first potential difference of a value of approximately 30 V and limit a difference between a respective potential at the motor terminals Ua, Va, Wa and a potential at the second intermediate circuit terminal ZK− to a predefined second potential difference of a value of approximately 30 V.

The first voltage clamping subunit 5a limits the difference between the respective potential at the motor terminals Ua, Va, Wa and the potential at the first intermediate circuit terminal ZK+ to the predefined first potential difference and the second voltage clamping subunit 5b limits the difference between the respective potential at the motor terminals Ua, Va, Wa and the potential at the second intermediate circuit terminal ZK− to the predefined second potential difference.

The first voltage clamping subunit 5a has diodes D1, D2, D3, D7, a capacitor C7 and a resistor R1 in the illustrated circuit. The diode D1 is electrically connected on the anode side to that terminal of the coil L1 that is electrically connected to the first motor terminal Ua. The diode D2 is electrically connected on the anode side to that terminal of the coil L2 that is electrically connected to the second motor terminal Va. The diode D3 is electrically connected on the anode side to that terminal of the coil L3 that is electrically connected to the third motor terminal Wa. The diodes D1 to D3 are electrically connected to one another on the cathode side. The resistor R1 is interconnected between the cathodes of the diodes D1 to D3 and the terminal ZK+. The diode D7 is electrically connected by way of its anode to the cathodes of the diodes D1 to D3 and is electrically connected by way of its cathode to an output KK1 of the first voltage clamping subunit 5a. The capacitor C7 is interconnected between the output KK1 of the first voltage clamping subunit 5a and the terminal ZK+.

The second voltage clamping subunit 5b has diodes D4, D5, D6, D8, a capacitor C8 and a resistor R2 in the illustrated circuit. The diode D4 is electrically connected on the cathode side to that terminal of the coil L1 that is electrically connected to the first motor terminal Ua. The diode D5 is electrically connected on the cathode side to that terminal of the coil L2 that is electrically connected to the second motor terminal Va. The diode D6 is electrically connected on the cathode side to that terminal of the coil L3 that is electrically connected to the third motor terminal Wa. The diodes D4 to D6 are electrically connected to one another on the anode side. The resistor R2 is interconnected between the anodes of the diodes D4 to D6 and the terminal ZK−. The diode D8 is electrically connected by way of its cathode to the anodes of the diodes D4 to D6 and is electrically connected by way of its anode to an output KK2 of the second voltage clamping subunit 5b. The capacitor C8 is interconnected between the output KK2 of the second voltage clamping subunit 5b and the terminal ZK−.

The coupling unit 4 furthermore has a feedback unit having a first feedback subunit RS1 and a second feedback subunit RS2 that transfers energy from the voltage clamping subunits 5a, 5b to the intermediate circuit of the inverter 2.

The first feedback subunit RS1 transfers energy from the first voltage clamping subunit 5a to the intermediate circuit of the inverter 2 and the second feedback subunit RS2 transfers energy from the second voltage clamping subunit 5b to the intermediate circuit of the inverter 2.

Figure 2:
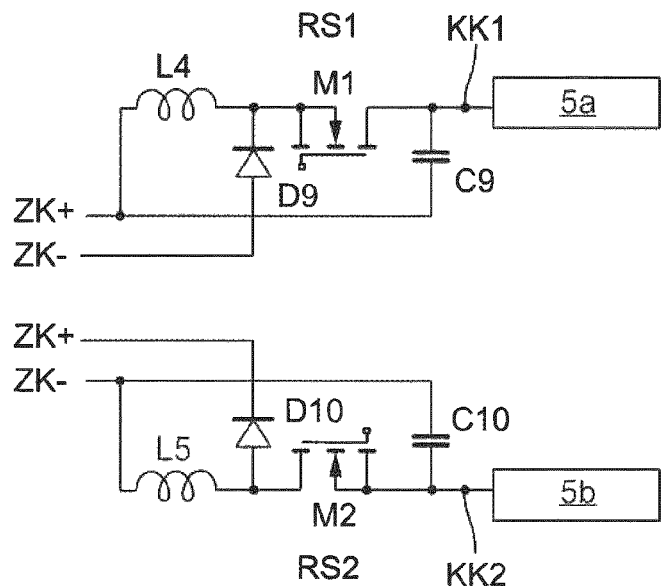
FIG. 2 shows a first embodiment of a feedback unit of the filter unit shown in FIG. 1.

FIG. 2 shows a first embodiment of a feedback unit comprising the feedback subunits RS1, RS2 of the filter unit 1 shown in FIG. 1. The feedback subunits RS1 and RS2 are each in the form of potential-connecting step-down converters. The feedback subunit RS1 has a capacitor C9, a field-effect transistor M1, a diode D9 and a coil L4 in the illustrated circuit. Accordingly, the feedback subunit RS2 has a capacitor C10, a field-effect transistor M2, a diode D10 and a coil L5 in the illustrated circuit.

Figure 3:
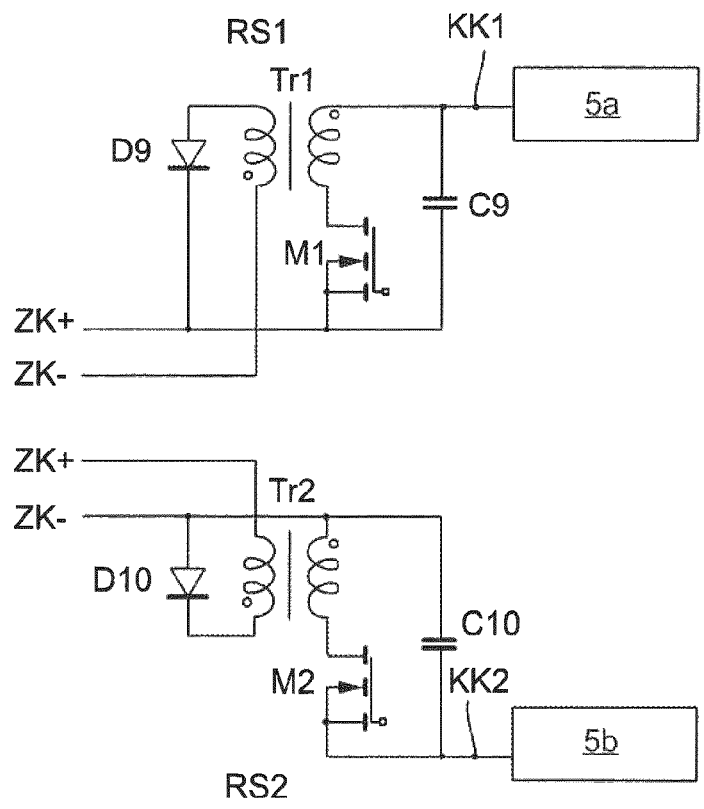
FIG. 3 shows a further embodiment of a feedback unit of the filter unit shown in FIG. 1.

FIG. 3 shows a further embodiment of a feedback unit comprising the feedback subunits RS1, RS2 of the filter unit 1 shown in FIG. 1. The feedback subunits RS1 and RS2 are each in the form of flyback converters. The feedback subunit RS1 has a capacitor C9, a transformer Tr1, a field-effect transistor M1 and a diode D9 in the illustrated circuit. Accordingly, the feedback subunit RS2 has a capacitor C10, a transformer Tr2, a field-effect transistor M2 and a diode D10 in the illustrated circuit.

Figure 4:
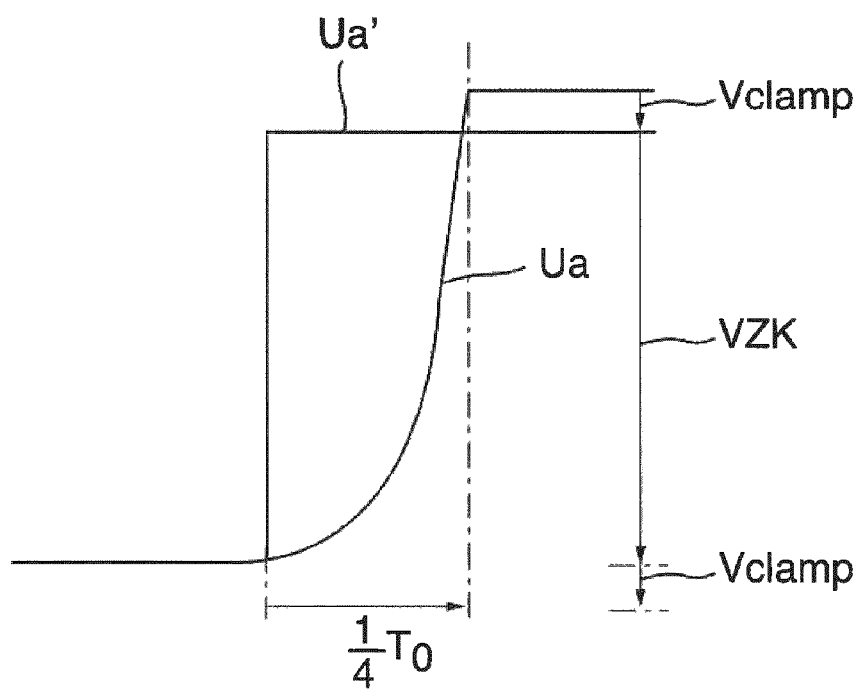
FIG. 4 shows an exemplary output voltage profile of the filter unit shown in FIG. 1.

FIG. 4 shows an exemplary output voltage profile Ua of the filter unit 1 shown in FIG. 1 compared with an idealized output voltage profile Ua' without using a filter unit 1.

The capacitors C1 to C6 are preferably in the form of ceramic capacitors that bleed off at ZK+ and ZK− due to the voltage dependency of the capacitance. An approximately constant capacitance above the voltage is thereby achieved.

If the capacitors C1 to C6 are each clamped at ZK+ and ZK−, then the resonant circuit consisting of L1, C1 in parallel with C4 is for example effective for the respective switching procedure.

The coil L1 and the capacitors C1 in parallel with C4, that is to say Lf and 2×Cf, effectively act as resonant circuit in the phase U, for example. The motor-side inductance is far greater than Lf and thus negligible. Cable capacitances have a boosting effect on Cf and additionally act as a filter capacitance, wherein Cy is still active in the inverter 2 in the return path.

In one embodiment that is not illustrated, a series of capacitors C1 to C3 or C4 to C6 may be dispensed with. The remaining capacitors should then preferably be in the form of film capacitors, so that the capacitance values are independent of the voltage.

As illustrated in FIG. 4, a reversal procedure in the case of free oscillation would rise to approximately twice the ZK voltage Vzk, but is clamped to a value of Vclamp, for example 30 V above and below the ZK voltage, by the diodes D1 to D6.

Due to the abrupt clamping and stray elements, there would be oscillations around the clamped voltage. The resistors R1 and R2 damp this oscillation, and the losses are relatively low.

The filter unit 1 according to the invention has the following advantages:
  relieving the power semiconductors in the inverter 2 from capacitive loads, for example cable capacitances (loss reduction);
  it is possible to use the maximum switching speed of the semiconductor switches in the inverter;
  a comparatively compact structure is possible, and so the active filter unit 1 is able to be integrated into a frequency inverter;
  low losses of the active filter unit 1;
  improvement in the EMC behavior;
  reduction in leakage currents on the motor side;
  parameters of the active filter unit (du/dt, clamping voltage, attenuation) able to be dimensioned independently of one another.

According to the invention, the outputs of the filter elements or coils L1 to L3 are capacitively coupled to the intermediate circuit ZK+, ZK− by way of the capacitors C1 to C6. Using low-inductance ceramic capacitors is advantageous here, since this achieves expedient EMC behavior.

Together with the relatively small low-loss individual chokes L1 to L3, this results in high-quality resonant circuits that, although they limit the voltage slew rate, would lead to high oscillating voltages at the terminals Ua, Va, Wa. These overvoltages are limited in two voltage clamping subunits 5a and 5b to a voltage of for example 30 V above ZK+ and −30 V below ZK− using the diodes D1 to D6 and the capacitors C7 and C8. The energy additionally stored in the chokes L1 to L3 during the switching edges is thereby output into the two voltage clamping subunits 5a and 5b.

In order to prevent a voltage increase in the two voltage clamping subunits 5a and 5b, the two feedback subunits RS1 and RS2 ideally keep the respective voltage across C9 and C10 to constant values, for example 30 V, independently of any load. The feedback subunits RS1 and RS2 may for example be in the form of potential-connecting step-down converters according to FIG. 2 or in the form of flyback converters according to FIG. 3. The variant involving flyback converters has the advantage that these are able to be designed identically on the primary side and the semiconductors would additionally operate at a more expedient operating point than the solution involving potential-connecting step-down converters.

The filter unit 1 according to the invention is able, due to its design, to be integrated into the frequency inverter 6 itself. This would not be possible using du/dt filters involving conventional technology due to the structural volume, the weight and the electrical losses. The filter unit 1 may be provided for example on a circuit board of the frequency inverter 6, on which circuit board power semiconductors of the inverter 2 are also provided. This is also expedient for EMC reasons, since the return paths to ZK+ and ZK− should have inductances that are as low as possible.

The electric motor 3 may be connected directly, that is to say on the shortest path, to the motor terminals Ua, Va, Wa. As an alternative, a for example shielded cable connection may be provided between the motor terminals Ua, Va, Wa and the motor in the switching cabinet or in the case of wall-mounted devices, for example. When using the cable connection, the capacitances in the possibly shielded cable connection may have considerable additional capacitances and thus additionally reduce the voltage slew rate. This may influence the design of the filter unit 1, in particular the dimensioning of the capacitors C1 to C8.

What is claimed is:

1. A filter unit for use between an inverter and an electric motor, wherein the filter unit comprises:
   a number of phase terminals for connection to corresponding phase terminals of the inverter;
   a first intermediate circuit terminal for connection to a first intermediate circuit terminal of the inverter and a second intermediate circuit terminal for connection to a second intermediate circuit terminal of the inverter;
   a number of motor terminals for connection to corresponding terminals of the electric motor;
   a number of filter elements, wherein a respective filter element is interconnected between corresponding phase terminals of the filter unit and corresponding motor terminals of the filter unit; and
   a coupling unit that capacitively couples the filter elements to the first intermediate circuit terminal and the second intermediate circuit terminal of the filter unit,
   wherein the coupling unit has a voltage clamping unit that limits a difference between a respective potential at the motor terminals and a potential at the first intermediate circuit terminal to a predefined first potential difference, and limits a difference between a respective potential at the motor terminals and a potential at the second intermediate circuit terminal to a predefined second potential difference.

2. The filter unit according to claim 1, wherein the coupling unit has a number of capacitors.

3. The filter unit according to claim 1, wherein the coupling unit has a feedback unit that transfers energy from the voltage clamping unit to an intermediate circuit of an inverter connected to the first intermediate circuit terminal and connected to the second intermediate circuit terminal.

4. The filter unit according to claim 1, wherein the voltage clamping unit comprises:
   a first voltage clamping subunit that limits a difference between the respective potential at the motor terminals and the potential at the first intermediate circuit terminal to the predefined first potential difference; and
   a second voltage clamping subunit that limits a difference between the respective potential at the motor terminals and the potential at the second intermediate circuit terminal to the predefined second potential difference.

5. A frequency inverter, comprising:
   an inverter; and
   a filter unit according to claim 1.

6. The filter unit according to claim 2, wherein the capacitors are ceramic capacitors.

7. The filter unit according to claim 3, wherein the feedback unit has at least one step-down converter.

8. The filter unit according to claim 3, wherein the feedback unit has at least one flyback converter.

9. The filter unit according to claim 3, wherein the voltage clamping unit comprises:
   a first voltage clamping subunit that limits a difference between the respective potential at the motor terminals and the potential at the first intermediate circuit terminal to the predefined first potential difference; and
   a second voltage clamping subunit that limits a difference between the respective potential at the motor terminals and the potential at the second intermediate circuit terminal to the predefined second potential difference.

10. The filter unit according to claim 4, wherein the coupling unit has a feedback unit, the feedback unit comprises:
    a first feedback subunit that transfers energy from the first voltage clamping subunit to an intermediate circuit of an inverter connected to the first intermediate circuit terminal and connected to the second intermediate circuit terminal; and
    a second feedback subunit that transfers energy from the second voltage clamping subunit to the intermediate circuit of the inverter connected to the first intermediate circuit terminal and connected to the second intermediate circuit terminal.

11. The filter unit according to claim 7, wherein the feedback unit has at least one flyback converter.

12. The filter unit according to claim 7, wherein the voltage clamping unit comprises:
    a first voltage clamping subunit that limits a difference between the respective potential at the motor terminals and the potential at the first intermediate circuit terminal to the predefined first potential difference; and
    a second voltage clamping subunit that limits a difference between the respective potential at the motor terminals and the potential at the second intermediate circuit terminal to the predefined second potential difference.

13. The filter unit according to claim 8, wherein the voltage clamping unit comprises:
    a first voltage clamping subunit that limits a difference between the respective potential at the motor terminals and the potential at the first intermediate circuit terminal to the predefined first potential difference; and
    a second voltage clamping subunit that limits a difference between the respective potential at the motor terminals and the potential at the second intermediate circuit terminal to the predefined second potential difference.

* * * * *